(12) United States Patent
Kim

(10) Patent No.: US 8,836,683 B2
(45) Date of Patent: Sep. 16, 2014

(54) BOOSTING CIRCUIT FOR WIDE RANGE SUPPLY VOLTAGE, ELECTRONIC DEVICE INCLUDING THE SAME AND VOLTAGE BOOSTING METHOD

(75) Inventor: Jeehwal Kim, Seoul (KR)

(73) Assignee: Samsung Electronics Co., Ltd., Suwon-Si, Gyeonggi-Do (KR)

( * ) Notice: Subject to any disclaimer, the term of this patent is extended or adjusted under 35 U.S.C. 154(b) by 598 days.

(21) Appl. No.: 12/844,401

(22) Filed: Jul. 27, 2010

(65) Prior Publication Data

US 2011/0050670 A1 Mar. 3, 2011

(30) Foreign Application Priority Data

Sep. 3, 2009 (KR) ................. 10-2009-0083129

(51) Int. Cl.
- G09G 5/00 (2006.01)
- H02M 3/156 (2006.01)
- G06F 1/30 (2006.01)
- G05F 1/46 (2006.01)
- G09G 3/36 (2006.01)
- H02J 9/00 (2006.01)
- H02J 9/06 (2006.01)

(52) U.S. Cl.
CPC .............. G05F 1/46 (2013.01); H02M 3/156 (2013.01); G06F 1/30 (2013.01); H02J 2009/068 (2013.01); G09G 3/3696 (2013.01); G09G 2330/021 (2013.01)
USPC ............................................. 345/211; 307/64

(58) Field of Classification Search
CPC ............ G09G 3/3696; G09G 2330/021; H02J 2009/068; G05F 1/46; G06F 1/30; H02M 3/156

USPC ...................................... 345/211, 212; 307/64
See application file for complete search history.

(56) References Cited

U.S. PATENT DOCUMENTS

| 6,326,959 | B1 | 12/2001 | Tanaka | |
|---|---|---|---|---|
| 2003/0007373 | A1* | 1/2003 | Satoh | ............... 363/60 |
| 2004/0207458 | A1 | 10/2004 | Origasa et al. | |
| 2005/0105305 | A1 | 5/2005 | Sawada et al. | |
| 2007/0008347 | A1* | 1/2007 | Choi | ............... 345/690 |
| 2008/0068768 | A1 | 3/2008 | Wu et al. | |
| 2009/0085538 | A1 | 4/2009 | Miguchi et al. | |
| 2009/0189572 | A1 | 7/2009 | Kamatani | |
| 2010/0265241 | A1* | 10/2010 | Tahata | ............... 345/212 |

FOREIGN PATENT DOCUMENTS

| CN | 1897077 | 1/2007 |
|---|---|---|
| CN | 101043149 | 9/2007 |
| CN | 101150284 | 3/2008 |
| CN | 101257307 | 9/2008 |
| JP | 04-286009 | 10/1992 |
| JP | 06-059751 | 3/1994 |
| JP | 06-067739 | 3/1994 |
| JP | 08-203281 | 8/1996 |

(Continued)

*Primary Examiner* — Chanh Nguyen
*Assistant Examiner* — John Kirkpatrick
(74) *Attorney, Agent, or Firm* — F. Chau & Associates, LLC

(57) ABSTRACT

Provided is a boosting circuit. The boosting circuit includes a voltage generator, a booster, a voltage detector, and a selector. The voltage generator receives an external first voltage to output a second voltage. The booster boosts an input voltage to output a third voltage. The voltage detector detects at least one voltage level of the first to third voltages to output a selection signal. The selector transfers one of the first and second voltages as the input voltage of the booster in response to the selection signal.

16 Claims, 10 Drawing Sheets

(56) References Cited

FOREIGN PATENT DOCUMENTS

| JP | 10-319368 | 12/1998 |
| JP | 11-355053 | 12/1999 |
| JP | 2004319011 | 11/2004 |
| JP | 2005129004 | 5/2005 |
| JP | 2006-211747 | 8/2006 |
| JP | 2009159729 | 7/2009 |
| KR | 1020080069317 | 7/2008 |

* cited by examiner

BOOSTING CIRCUIT FOR WIDE RANGE SUPPLY VOLTAGE, ELECTRONIC DEVICE INCLUDING THE SAME AND VOLTAGE BOOSTING METHOD

CROSS-REFERENCE TO RELATED APPLICATIONS

This U.S. non-provisional patent application claims priority under 35 U.S.C. §119 to Korean Patent Application No. 10-2009-0083129, filed on Sep. 3, 2009, the disclosure of which is incorporated by reference herein.

BACKGROUND

1. Technical Field

Embodiments of the inventive concept relate to a semiconductor integrated circuit, and more particularly, to a boosting circuit, which boosts an input voltage to a desired-level voltage and outputs the boosted voltage.

2. Discussion of Related Art

A semiconductor integrated circuit performs various functions, requires various operation voltages, and includes a boosting circuit for generating an operation voltage of a desired level. The boosting circuit boosts an external power source voltage to the desired voltage level and outputs the boosted voltage.

A mobile device may receive a power source voltage from a battery. Due to the battery, as time of use of the mobile device elapses, the level of an output voltage is shifted. However, when the level of a power source voltage is excessively shifted, the boosting circuit of the semiconductor integrated circuit cannot stably generate an operation voltage of a desired level, which may cause a malfunction of the semiconductor integrated circuit.

SUMMARY

At least one exemplary embodiment of the inventive concept provides a boosting circuit, which can cope with an input voltage of a wide range.

At least one exemplary embodiment of the inventive concept provides a boosting circuit including: a voltage generator receiving an external first voltage to output a second voltage; a booster boosting an input voltage to output a third voltage; a voltage detector detecting at least one voltage level of the first to third voltages to output a selection signal; and a selector transferring one of the first and second voltages as the input voltage of the booster in response to the selection signal.

In some embodiments, the voltage detector may respectively compare the first to third voltages with first to third reference voltages, and may output the selection signal according to a result of the comparison.

In other embodiments, the voltage detector may include: a reference voltage generator generating first to third reference voltages; a first comparator comparing the first voltage with the first reference voltage; a second comparator comparing the second voltage with the second reference voltage; a third comparator comparing the third voltage with the third reference voltage; and a logic circuit receiving outputs of the first to third comparators to output the selection signal.

In still other embodiments, the selector may include: a first switch connected between the first voltage and the booster, and controlled by an inverted signal of the selection signal; and a second switch connected between the second voltage from the voltage generator and the booster, and controlled by the selection signal.

In even other embodiments, the voltage generator may include: a bandgap reference generator generating a bandgap reference voltage; and an amplifier receiving the first voltage as a power source voltage, and amplifying the bandgap reference voltage to output the second voltage.

In yet other embodiments, the boosting circuit may further include: a bandgap reference generator generating a bandgap reference voltage; and an amplifier receiving the third voltage as a power source voltage, and amplifying the bandgap reference voltage to output a fourth voltage.

In further embodiments, the booster may include first and second boosting units having different boosting rates.

In still further embodiments, the voltage detector may further output a boosting rate selection signal according to the respective detected levels of the first to third voltages.

In even further embodiments, the selector may input the selected voltage of the first and second voltages to one of the first and second boosting units according to the boosting rate selection signal.

In yet further embodiments, the voltage detector may respectively compare the first to third voltages with corresponding first to third reference voltages, and when the respective first to third voltages are lower than the corresponding first to third reference voltages, the voltage detector may output the boosting rate selection signal for selecting a boosting unit having a high boosting rate from among the first and second boosting units.

In at least one exemplary embodiment of the inventive concept, an electronic device includes: a processor; a display panel; and a display driver receiving an image signal from the processor, and driving the display panel for an image to be displayed on the display panel. The display driver includes: a voltage generator receiving an external first voltage to output a second voltage; a booster boosting an input voltage to output a third voltage; a voltage detector detecting at least one voltage level of the first to third voltages to output a selection signal; a selector transferring one of the first and second voltages as the input voltage of the booster in response to the selection signal; a bandgap reference generator generating a bandgap reference voltage; and an amplifier receiving the third voltage as a power source voltage, and amplifying the bandgap reference voltage to output a fourth voltage.

In some embodiments, the voltage detector may include: a reference voltage generator generating first to third reference voltages; a first comparator comparing the first voltage with the first reference voltage; a second comparator comparing the second voltage with the second reference voltage; a third comparator comparing the third voltage with the third reference voltage; and a logic circuit receiving outputs of the first to third comparators to output the selection signal.

In other embodiments, the processor may generate a control signal for turning on or turning off operations of the first to third comparators, and a voltage setting signal for setting a level of each of the first to third reference voltages. The control signal may be provided to the first to third comparators and the reference voltage generator, and the voltage setting signal may be provided to the reference voltage generator.

In still other embodiments, the processor may generate the voltage setting signal for the first to third reference voltages to have a hysteresis characteristic.

In even other embodiments, the booster may include first and second boosting units having different boosting rates.

In yet other embodiments, the voltage detector may further output a boosting rate selection signal according to the respective detected levels of the first to third voltages.

In further embodiments, the selector may input the selected voltage of the first and second voltages to one of the first and second boosting units according to the boosting rate selection signal.

In still further embodiments, the logic circuit of the voltage detector may further output a boosting rate selection signal for selecting one of the first and second boosting units.

In even further embodiments, the processor may output a boosting rate selection signal for selecting one of the first and second boosting units, and the selector may input a voltage, which is selected from among the first and second voltages, to one of the first and second boosting units according to the boosting rate selection signal.

In at least one exemplary embodiment of the inventive concept, a voltage boosting method includes: receiving an external first voltage to output a second voltage, boosting an input voltage to output a third voltage, detecting at least one voltage level of the first to third voltages to output a selection signal, selecting one of the first and second voltages in response to the selection signal, and transferring one of the first and second voltages as the input voltage.

In some embodiments, the detecting of at least one voltage level may include: generating first to third reference voltages which respectively corresponds to the first to third voltages, and comparing the first to third voltages with the corresponding first to third reference voltages, respectively.

In other embodiments, the detecting of at least one voltage level may further include: generating a voltage setting signal, controlling generation of the first to third reference voltages in response to the voltage setting signal, and selectively comparing the first to third voltages with the corresponding first to third reference voltages in response to the voltage setting signal.

BRIEF DESCRIPTION OF THE DRAWINGS

The accompanying drawings illustrate exemplary embodiments of the inventive concept and, together with the description, serve to explain principles of the inventive concept. In the drawings.

DETAILED DESCRIPTION OF THE EXEMPLARY EMBODIMENTS

Exemplary embodiments of the inventive concept will be described below in more detail with reference to the accompanying drawings. The inventive concept may, however, be embodied in different forms and should not be construed as limited to the embodiments set forth herein. Rather, these embodiments are provided so that this disclosure will be thorough and complete, and will fully convey the scope of the inventive concept to those skilled in the art.

Hereinafter, exemplary embodiments of the inventive concept will be described in detail with reference to the accompanying drawings.

Figure 1:
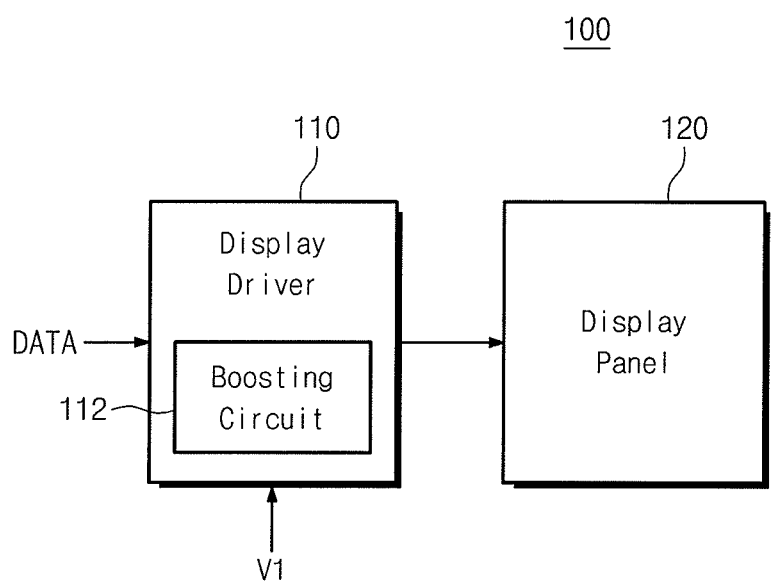
FIG. 1 is a diagram exemplarily illustrating a display device which includes a boosting circuit according to an exemplary embodiment of the inventive concept.

FIG. 1 is a diagram exemplarily illustrating a display device which includes a boosting circuit according to an exemplary embodiment of the inventive concept.

Referring to FIG. 1, a display device 100 includes a display driver 110, and a display panel 120. The display driver 110 receives an image data signal DATA from the outside and outputs various control signals for an image to be displayed on the display panel 120. The display driver 110 may further receive a clock signal (not shown) and a sync signal (not shown), in addition to the external image data signal DATA. The display driver 110 receives a power source voltage V1 from the outside. A boosting circuit 112 included in the display driver 110 boosts the power source voltage V1 to generate a high voltage necessary for the driving of the display panel 120.

Mobile electronic devices such as portable phones, Personal Digital Assistants (PDA), digital cameras and notebook computers receive a power source voltage from a battery (not shown). For an iridium ion battery that may be used for the mobile electronic device, as time of use elapses, a discharge voltage becomes lower in characteristic. The display device 100 included in the mobile electronic device receives the power source voltage V1 from the battery (not shown). Therefore, the boosting circuit 112 should stably generate a desired level of boosting voltage although the power source voltage V1 becomes lower.

In this embodiment, the boosting circuit 112 included in the mobile electronic device has been described as an example, but a boosting circuit according to embodiments of the inventive concept may be applied to other electronic devices such as Liquid Crystal Display (LCD) televisions, Plasma Display Panel (PDP) televisions, Organic Light Emitting Display (OLED) televisions and refrigerators, in addition to mobile electronic devices.

Figure 2:
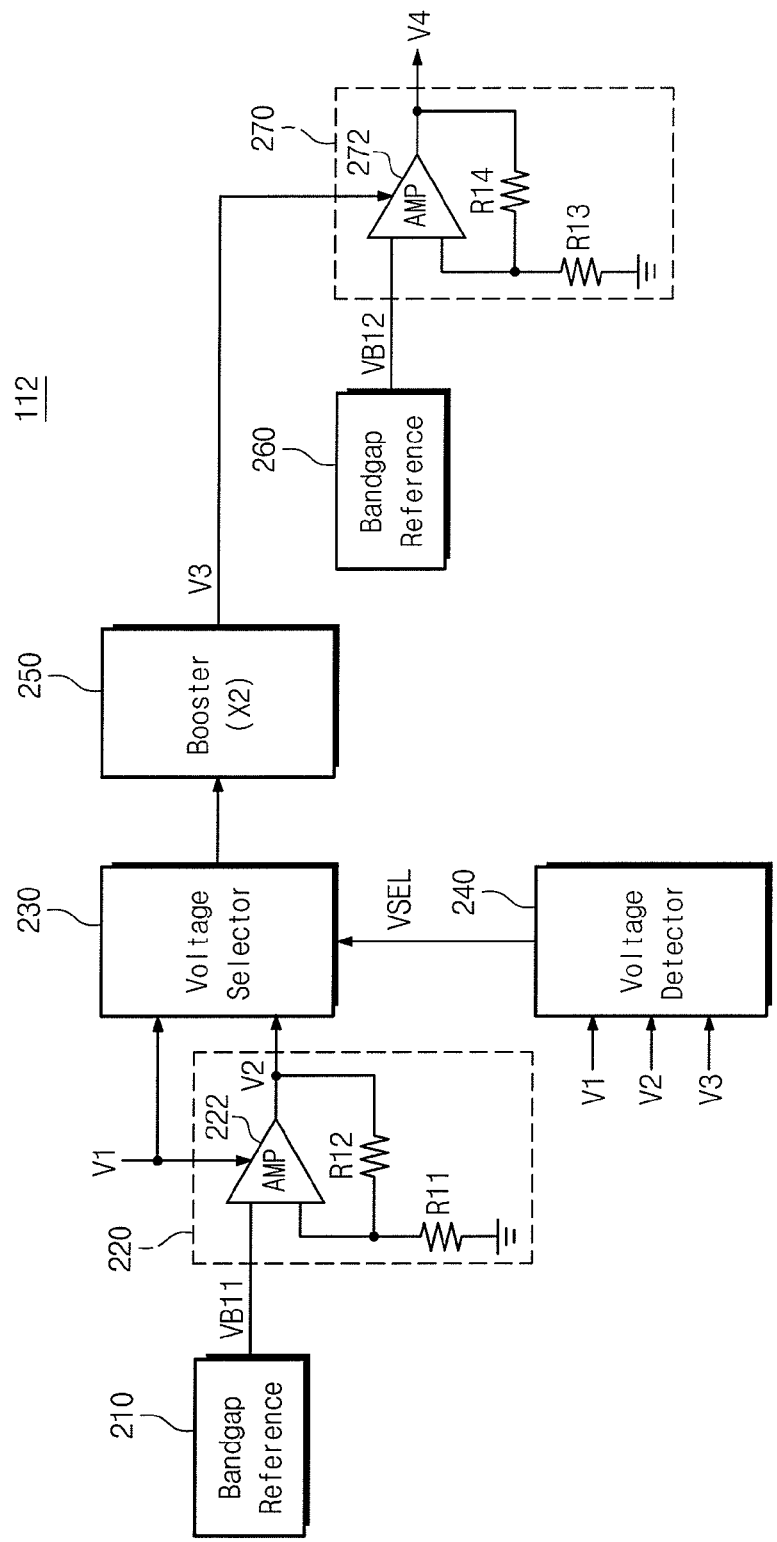
FIG. 2 is a diagram exemplarily illustrating a boosting circuit according to an exemplary embodiment of the inventive concept.

FIG. 2 is a diagram illustrating a boosting circuit according to an exemplary embodiment of the inventive concept.

Referring to FIG. 2, the boosting circuit 112 includes bandgap reference generators 210 and 260, amplifiers 220 and 270, a voltage selector 230, a voltage detector 240, and a booster 250. The bandgap reference generator 210 generates a bandgap reference voltage VB11, being a reference voltage, having a stable voltage level. The amplifier 220 may be configured with an operational amplifier 222 and a non-inverting amplifier including resistors R11 and R12. The amplifier 220 receives the bandgap reference voltage VB11 from the bandgap reference generator 210 to output a second voltage V2.

The voltage selector 230 selects and outputs one of the power source voltage V1 inputted from the outside and the second voltage V2 from the amplifier 220, in response to a voltage selection signal VSEL from the voltage detector 240. Hereinafter, the power source voltage V1 inputted from the outside is referred to as a first voltage V1.

The booster 250 boosts an input voltage at a certain boosting rate to output the boosted voltage. The input voltage of the booster 250 is one of the first and second voltages V1 and V2 that are outputted from the voltage selector 230. The boosting rate of the booster 250 may be set according to the relationship between the first voltage V1, the second voltage V2 and a fourth voltage V4 to be finally obtained. For example, the boosting rate of the booster 250 may be set as two times. For example, when the voltage selector 230 selects and outputs a voltage of 2.3 V that is outputted from the amplifier 220, the booster 250 outputs a third voltage V3 being a boosting voltage of 4.6 V.

The bandgap reference generator 260 generates a bandgap reference voltage VB12. The amplifier 270 includes an operational amplifier 272, and resistors R13 and R14. The amplifier 270 receives the third voltage V3 as a power source voltage. The amplifier 270 receives the bandgap reference voltage VB12 to generate the fourth voltage V4. The voltage V4 may be used as a voltage necessary for the driving of the display panel 120 in FIG. 1.

The voltage detector 240 senses the level of the first voltage V1 inputted from the outside, the level of the second voltage V2 from the amplifier 220 and the level of the third voltage V3 from the booster 250, and outputs the voltage selection signal VSEL according to the sensed voltage levels. The voltage selection signal VSEL is for selecting a voltage, which is to be boosted by the booster 250, from among the first and second voltages V1 and V2. When the first to third voltages V1 to V3 have a higher voltage level than a predetermined reference voltage, the voltage detector 240 outputs the voltage selection signal VSEL for the second voltage V2 from the amplifier 220 to be boosted. When the first to third voltages V1 to V3 have a lower voltage level than the predetermined reference voltage, the voltage detector 240 outputs the voltage selection signal VSEL for the first voltage V1 to be boosted. In an initial stage, when the supply of the first voltage V1 is applied from the outside, the second and third voltages V2 and V3 cannot reach a sufficient stable level. At this point, the voltage selector 230 may be designed so that it may select the first voltage V1 to supply it as the input voltage of the booster 250 irrespective of the voltage selection signal VSEL.

Figure 3:
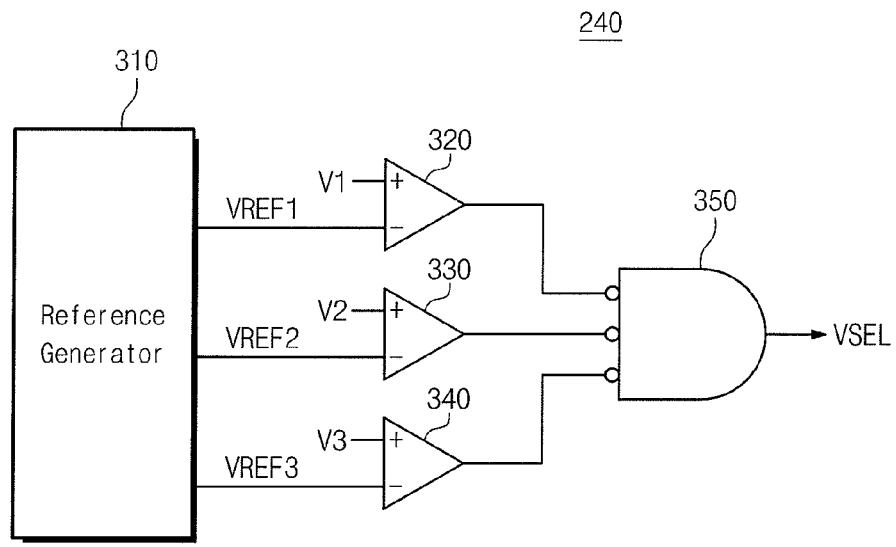
FIG. 3 is a diagram exemplarily illustrating the configuration of a voltage detector in FIG. 2.

FIG. 3 is a diagram exemplarily illustrating the configuration of the voltage detector in FIG. 2 according to an exemplary embodiment of the inventive concept.

Referring to FIG. 3, the voltage detector 240 includes a reference voltage generator 310, comparators 320 to 340, and a logic circuit 350. The reference voltage generator 310 generates three reference voltages VREF1 to VREF3. The first to third reference voltages VREF1 to VREF3 of the reference voltage generator 310 are respectively set at optimal voltage levels that are required by the boosting circuit 112.

The comparator 320 compares the first voltage V1 from the outside and the first reference voltage VREF1. The comparator 330 compares the second voltage V2 from the amplifier 220 in FIG. 2 and the second reference voltage VREF2. The comparator 340 compares the third voltage V3 from the booster 250 and the third reference voltage VREF3.

The logic circuit 350 outputs the voltage selection signal VSEL at a high level or a low level according to the levels of signals outputted from the comparators 320 to 340. When the respective reference voltages VREF1 to VREF3 are lower than a corresponding voltage among first to third voltages V1 to V3, the logic circuit 350 outputs a high level of selection signal SEL. At this point, the voltage selector 230 of FIG. 2 provides the external first voltage V1 to the booster 250. In a case other than a case where the respective reference voltages VREF1 to VREF3 are lower than a corresponding voltage among first to third voltages V1 to V3, the logic circuit 350 outputs a low level of selection signal SEL. At this point, the voltage selector 230 of FIG. 2 provides the second voltage V2, which is outputted from the amplifier 220, to the booster 250.

In FIG. 2, the second voltage V2 is generated based on the bandgap reference voltage VB11 that is generated by the bandgap reference generator 210, but when the level of the first voltage V1 that is supplied as the power source voltage of the bandgap reference generator 210 and the power source voltage of the operational amplifier 222 becomes lower than a certain level, i.e., the first reference voltage VREF1, the second voltage V2 outputted from the amplifier 222 becomes lower than the first voltage V1. Therefore, when the first voltage V1 is lower than the first reference voltage VREF1, the second voltage V2 is lower than the second reference voltage VREF2 and the third voltage V3 is lower than the third reference voltage VREF3, by supplying the first voltage V1 as the input of the booster 250, the boosting operation of the boosting circuit 112 may be normally performed although the first voltage V1 is lower than the allowable range of the bandgap reference generator 210 and the allowable range of the amplifier 220 is inputted.

Moreover, the voltage detector 240 respectively compares the first voltage V1, the second voltage V2 and the boosted third voltage V3 with the reference voltages VREF1 to VREF3 corresponding to them, and thus, even when the first voltage V1 is temporarily shifted by distortion, the voltage detector 240 can stably detect voltage levels.

FIG. 3 illustrates the circuit configuration of the voltage detector 240 for respectively comparing the first voltage V1, the second voltage V2 and the boosted third voltage V3 with the reference voltages VREF1 to VREF3 corresponding to them. But for detecting whether the first voltage V1 becomes lower than the predetermined reference level, the voltage detector 240 may be modified to have a configuration that may detect a portion of the levels of the first to third voltages V1 to V3 and may include an element that may further detect the level of the fourth voltage V4.

Figure 4:
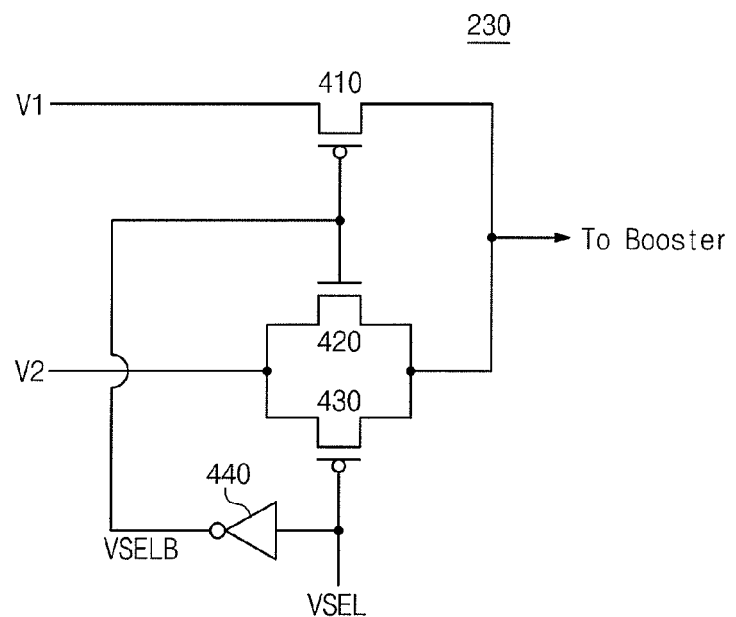
FIG. 4 is a diagram exemplarily illustrating the configuration of a voltage selector in FIG. 2.

FIG. 4 is a diagram illustrating the configuration of the voltage selector 230 in FIG. 2 according to an exemplary embodiment of the inventive concept.

Referring to FIG. 4, the voltage selector 230 includes PMOS transistors 410 and 430, an NMOS transistor 420, and an inverter 440. The PMOS transistor 410 is connected between the first voltage V1 from the outside and the booster 250, and is controlled by an inversion voltage selection signal VSELB that has been inverted through the inverter 440. The NMOS transistor 420 and the PMOS transistor 430 operate as a transmission gate. The NMOS transistor 420 and the PMOS transistor 430 are connected between the second voltage V2 from the amplifier 220 and the booster 250. The gate of the NMOS transistor 420 is controlled by the inversion voltage selection signal VSELB outputted from the inverter 440, and the gate of the PMOS transistor 430 is controlled by the voltage selection signal VSEL.

The voltage selector 230 transfers the first voltage V1 to the booster 250 when the voltage selection signal VSEL has a high level, and the voltage selector 230 transfers the second voltage V2 to the booster 250 when the voltage selection signal VSEL has a low level.

Figure 5:
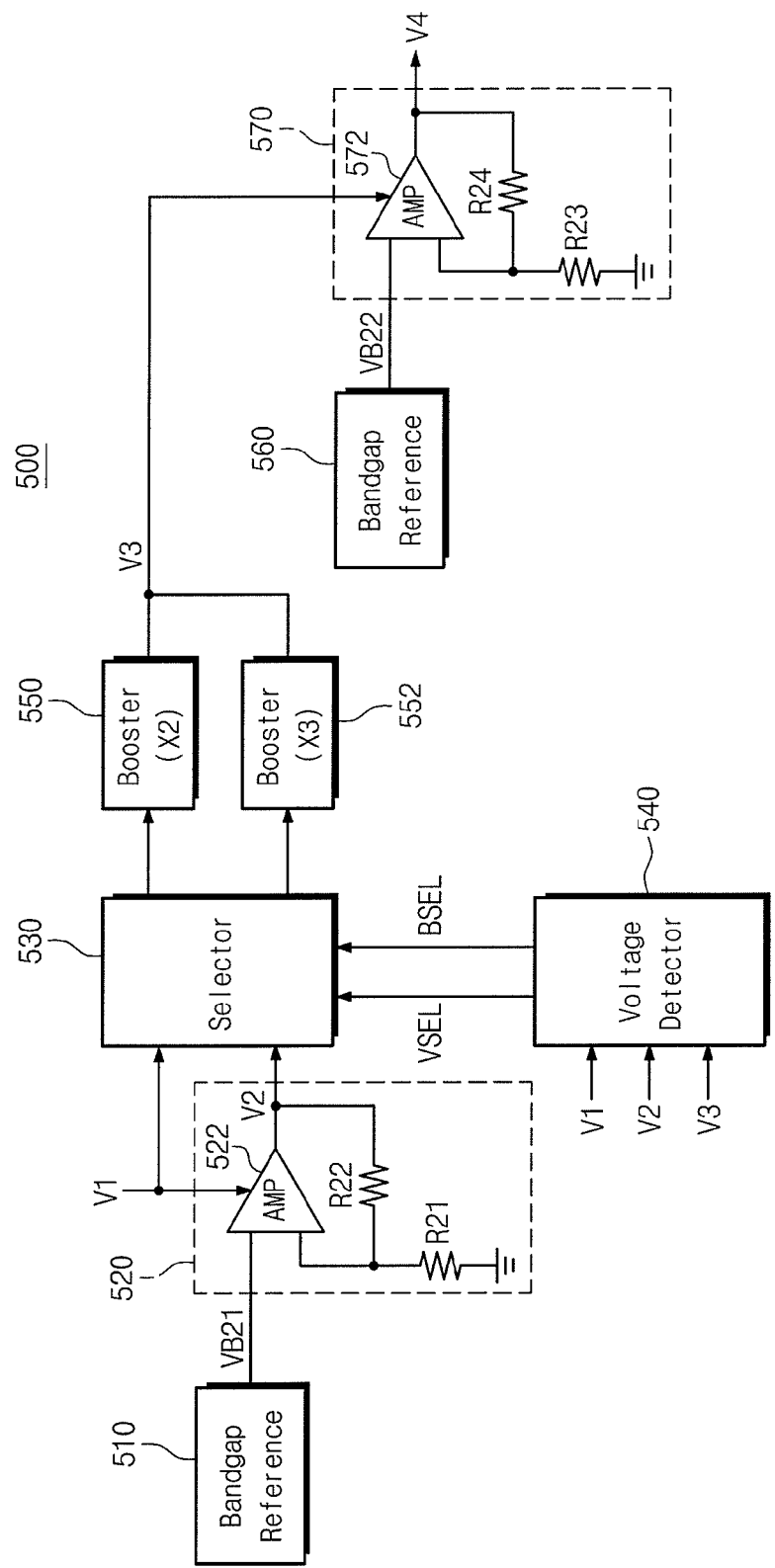
FIG. 5 is a diagram exemplarily illustrating a boosting circuit according to an exemplary embodiment of the inventive concept.

FIG. 5 is a diagram illustrating a boosting circuit according to an exemplary embodiment of the inventive concept.

Referring to FIG. 5, a boosting circuit 500 according to an exemplary embodiment of the inventive concept includes bandgap reference generators 510 and 560, amplifiers 520 and 570, a voltage selector 530, a voltage detector 540 and includes two boosters 550 and 552, unlike the boosting circuit 112 of FIG. 2. The amplifier 520 may be configured with an operational amplifier 522 and a non-inverting amplifier including resistors R21 and R22 and amplifier 570 may be configured with an operational amplifier 572 and a non-inverting amplifier including resistors R23 and R24. Hereinafter, a repetitive description on the same elements as those of the boosting circuit 112 in FIG. 2 will be omitted. The boosters 550 and 552 have different boosting rates. For example, the booster 550 boosts the level of an input voltage by two times to generate a third voltage V3, and the booster 552 boosts the level of an input voltage by three times to generate the third voltage V3.

The voltage detector 540 further outputs a boosting rate selection signal BSEL, in addition to a voltage selection signal VSEL for selecting one of the first and second voltages V1 and V2. For example, when a first voltage V1 is higher than a predetermined reference voltage level, the voltage detector 540 outputs a first level of boosting rate selection signal BSEL for the booster 550 to be selected. When a first voltage V1 is lower than a predetermined reference voltage level, the voltage detector 540 outputs a second level of boosting rate selection signal BSEL for the booster 552 to be selected. As described above with reference to FIG. 3, for preventing a malfunction when the first voltage V1 is distorted by noise, the voltage detector 540 outputs the boosting rate selection signal BSEL on the basis of the levels of the first to third voltages V1 to V3.

The selector 530 selects one of the first and second voltages V1 and V2 in response to the voltage selection signal VSEL, and transfers the selected voltage to one of the boosters 550 and 552 in response to the boosting rate selection signal BSEL.

In another embodiment, the voltage detector 540 does not divide and output the voltage selection signal VSEL and the boosting rate selection signal BSEL, and may output only the voltage selection signal VSEL. In this example, the selector 530 may be designed so that it may select the first voltage V1 and the booster 552 and thereby the selected voltage V1 may be boosted by the booster 552 having a higher boosting rate when the voltage selection signal VSEL has a high level.

In this embodiment, the booster 500 including the two boosters 550 and 552 has been exemplarily described above, but a plurality of boosters having various boosting rates may be included in the boosting circuit 500. At this point, the boosting rate selection signal BSEL outputted from the voltage detector 540 may be configured with a plurality of bits so that the selector 530 may select any one of the plurality of boosters.

Figure 6:
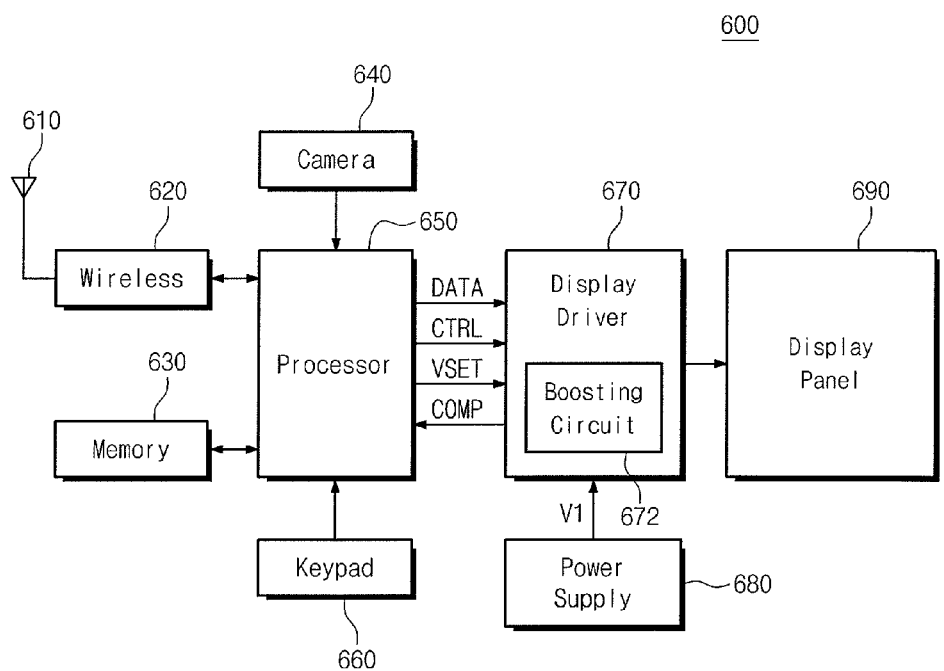
FIG. 6 is a diagram illustrating a portable phone as an example of an electronic device according to an exemplary embodiment of the inventive concept.

FIG. 6 is a diagram illustrating the configuration of a portable phone as an example of an electronic device according to an exemplary embodiment of the inventive concept.

Referring to FIG. 6, a portable phone includes an antenna 610, a wireless transceiver 620, a memory 630, a camera 640, a processor 650, an input unit 660, a display driver 670, a power supply 680, and a display panel 690. Herein, the input unit may be implemented with a keypad.

The wireless transceiver 620 converts a wireless signal received through the antenna 610 into a data signal to transfer the data signal to the processor 650, and converts a data signal from the processor 650 into a wireless signal to transfer the data signal to the antenna 610.

The processor 650 controls the overall operation of the portable phone 600. The memory 630 stores program codes and user data necessary for the operation of the processor 600.

The camera 640 converts image information, which is inputted from the outside, into a data signal to provide the data signal to the processor 650. The keypad 660 is an input device for inputting a user's data.

The display driver 670 receives an image data signal DATA from the processor 650 and performs controlling for an image to be displayed on the display panel 690. The processor 650 may further provide the image data signal DATA, a clock signal and a sync signal to display driver 670. The display panel 690 may be configured with any one of an LCD panel, a Light Emitting Diode (LED) panel, an OLED panel and a PDP panel. The display driver 670 performs a signal conversion operation and a control operation suitable for the driving of the display panel 690 in response to the image data signal, the clock signal and the sync signal that are inputted from the processor 650 according to the type of the display panel 690.

The power supply 680 provides a power source voltage, which is supplied from one of an Alternating Current (AC) adapter (not shown) or an iridium-ion battery (not shown), as a first voltage V1 of the display driver 760. The first voltage V1 from the power supply 680 may be used as a power source voltage for the display driver 760 and the other elements of the portable phone 600. The iridium-ion battery has a long life because of no memory effect, but has characteristic in which a discharge voltage becomes lower with the elapse of time of use. For example, although the iridium-ion battery may have a battery voltage of about 4.2 V in a full charge state, as time of discharge becomes longer, the battery voltage gradually becomes lower and may thereby decrease to, for example, about 2.3 V or less. In this way, although the voltage of the power supply 680 is widely shifted from about 4.2 V to about 2.3 V, the display driver 670 should stably drive the display panel 690.

The processor 650 further provides the image data signal DATA, a control signal CTRL and a voltage setting signal VSET to the display driver 670. The boosting circuit 672 included in the display driver 670 boosts a the first voltage V1 to provide a comparison signal COMP indicating an operation state, in response to the control signal CTRL and the voltage setting signal VSET that are inputted from the processor 650

Figure 7:
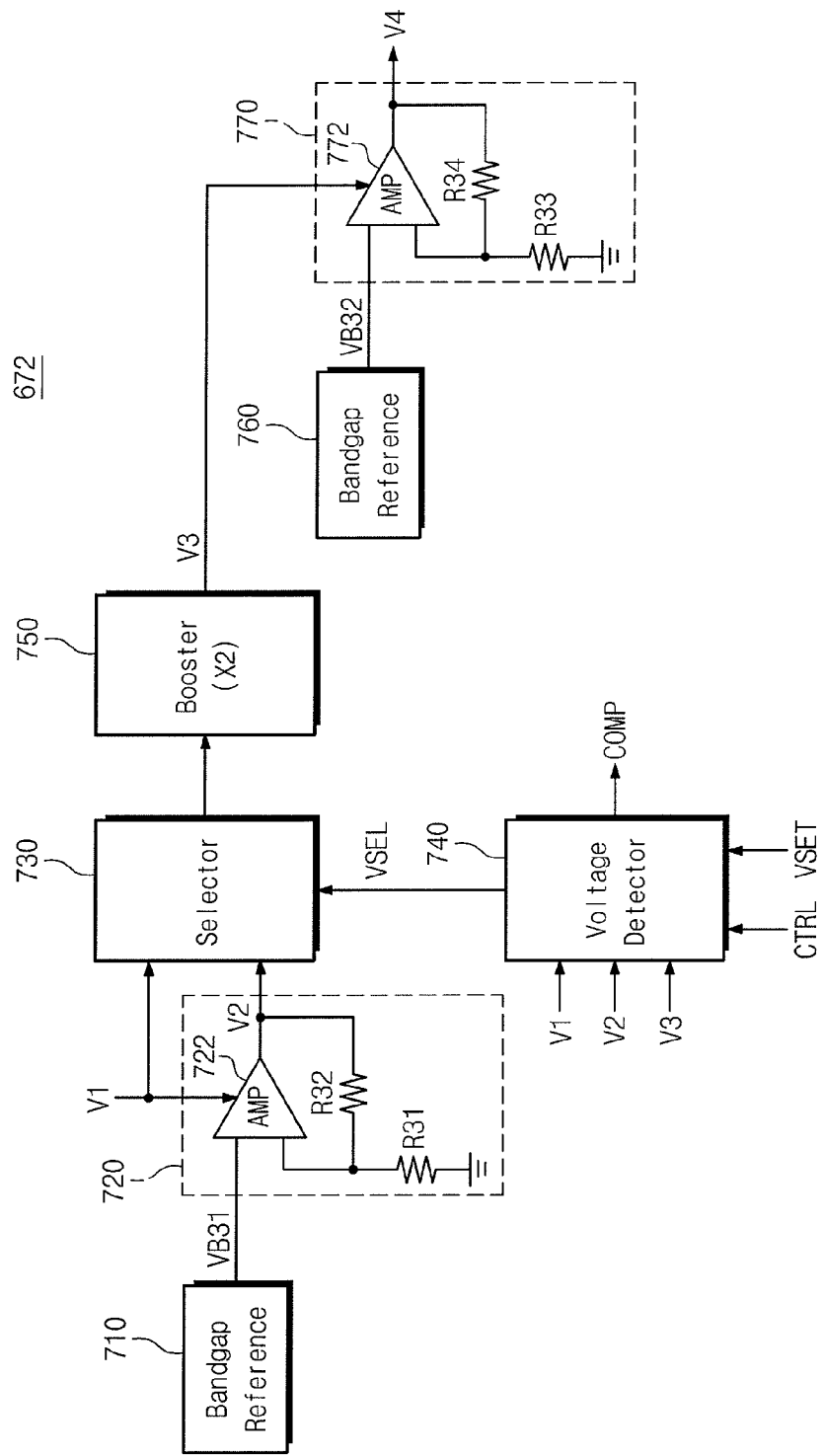
FIG. 7 is a diagram illustrating a boosting circuit in FIG. 6 according to an exemplary embodiment of the inventive concept.

FIG. 7 is a diagram illustrating the configuration of the boosting circuit in FIG. 6 according to an exemplary embodiment of the inventive concept.

The boosting circuit 672 of FIG. 7 has a circuit configuration similar to the boosting circuit of FIG. 2. For example, the boosting circuit 672 includes bandgap reference generators 710 and 760, amplifiers 720 and 770, a voltage selector 730, a voltage detector 740, and a booster 750. The amplifier 720 may be configured with an operational amplifier 722 and a non-inverting amplifier including resistors R31 and R32 and amplifier 770 may be configured with an operational amplifier 772 and a non-inverting amplifier including resistors R33 and R34. Unlike the boosting circuit 112 of FIG. 2, a voltage detector 740 included in the boosting circuit 672 of FIG. 7 operates in response to the control signal CTRL and the voltage setting signal VSET that are inputted from the processor 650.

Figure 8:
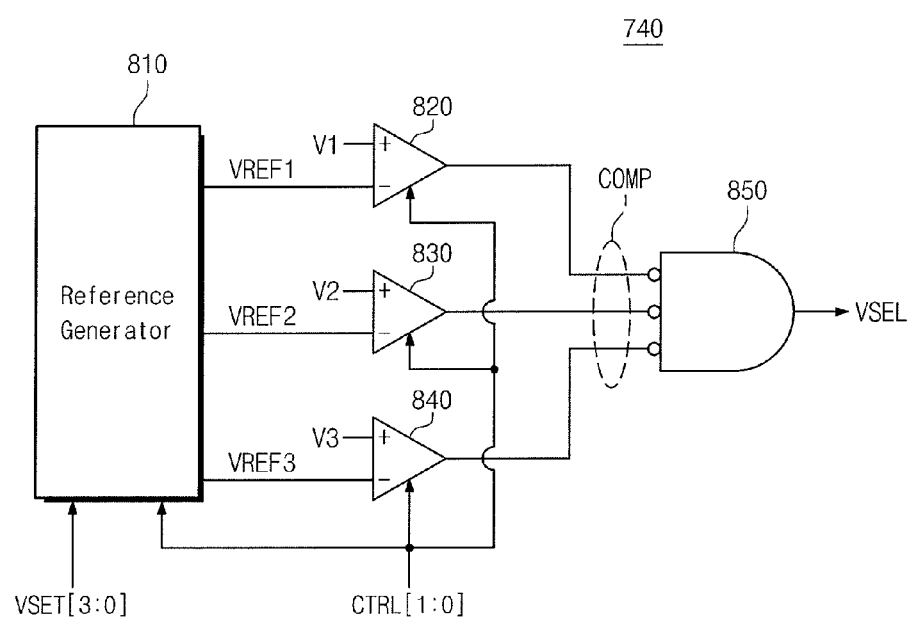
FIG. 8 is a diagram illustrating a voltage detector in FIG. 7 according to an exemplary embodiment of the inventive concept.

FIG. 8 is a diagram illustrating the detailed configuration of the voltage detector in FIG. 7 according to an exemplary embodiment of the inventive concept.

Referring to FIG. 8, the voltage detector 740 includes a reference voltage generator 810, comparators 820 to 840, and a logic circuit 850. The reference voltage generator 810 generates first to third reference voltages VREF1 to VREF3 in response to the control signal CTRL and the voltage setting signal VSET. In this embodiment, the control signal CTRL is a 2-bit signal, and the voltage setting signal VSET is a 4-bit signal, but the signals are not limited thereto. The comparator 820 receives the first voltage V1 and the first reference voltage VREF1. The comparator 830 receives a second voltage V2 and the second reference voltage VREF2. The comparator 840 receives a third voltage V3 and the third reference voltage VREF3. The logic circuit 850 receives signals outputted from the comparators 820 to 840 to output a voltage selection signal VSEL. As comparison signals COMP, the signals outputted from the comparators 820 to 840 are provided to the processor 650.

The comparators 820 to 840 are turned on/off in response to a control signal CTRL[1:0]. The reference voltage generator 810 selectively generates the first to third reference voltages VREF1 to VREF3 in response to the control signal CTRL[1:0]. A summary of the turn-on/off states of the comparators 820 to 840 in accordance with the control signal CTRL[1:0] and whether the first to third reference voltages VREF1 to VREF3 of the reference voltage generator 810 are generated is listed in Table 1 below.

TABLE 1

| CTRL[1:0] | Comparator 820 | Comparator 830 | Comparator 840 | VREF1 | VREF2 | VREF3 |
|---|---|---|---|---|---|---|
| 00 | ON | ON | ON | Generation | Generation | Generation |
| 01 | ON | ON | OFF | Generation | Generation | Non-generation |
| 10 | ON | OFF | OFF | Generation | Non-generation | Non-generation |

In the Table 1, the turn-on/off states of the comparators 820 to 840 in accordance with the control signal CTRL[1:0] and whether the first to third reference voltages VREF1 to VREF3 of the reference voltage generator 810 are generated is merely an example, and their respective states in accordance with the control signal CTRL may be variously changed and implemented.

In this way, by controlling the reference voltage generation operation of the reference voltage generator 810 and the operations of the comparators 820 to 840 according to the control signal CTRL, the consumption power of the voltage detector 740 can be reduced.

The reference voltage generator 810 generates the first to third reference voltages VREF1 to VREF3 having hysteresis characteristic in response to a voltage setting signal VSET[3:0]. The processor 650 outputs the voltage setting signal VSET[3:0] for controlling the levels of the first to third reference voltages VREF1 to VREF3 according to the comparison signal COMP that is outputted from the comparators 820 to 830. For example, in the initial stage, when the output of the comparator 820 is shifted from a high level to a low level in a state where the first reference voltage VREF1 is set to, for example, about 2.5 V, the processor 650 outputs the voltage setting signal VSET[3:0] so that the first reference voltage VREF1 generated in the reference voltage generator 810 may be set to, for example, about 2.7 V higher than 2.5 V. Then, when the first voltage V1 increases to about 2.7 V, the output of the comparator 820 can be inverted. In this state, when the first voltage V1 increases to higher than about 2.7 V, the output of the comparator 820 can be shifted to a high level. At this point, the processor 650 outputs the voltage setting signal VSET[3:0] so that the first reference voltage VREF1 generated in the reference voltage generator 810 may be set to about 2.5 V lower than 2.7 V. Then, when the first voltage V1 decreases to lower than about 2.5 V, the output of the comparator 820 can be inverted.

According to embodiments of the inventive concept, the repetitive shift of the voltage setting signal VSET[3:0] between a high level and a low level, which occurs when the first to third voltages V1 to V3 are shifted near a fixed reference voltage, can be prevented.

Figure 9:
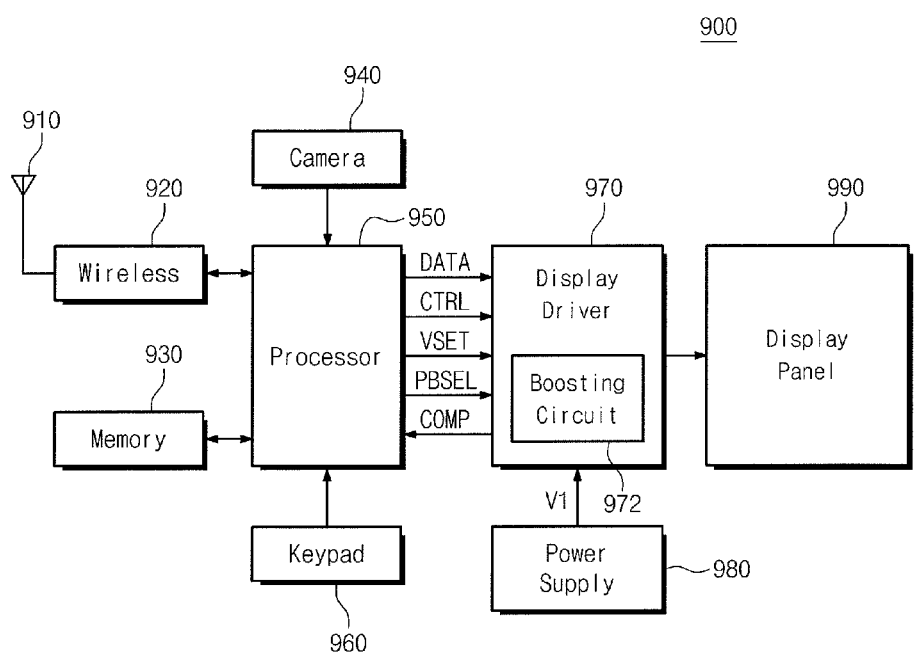
FIG. 9 is a diagram illustrating a portable phone according to an exemplary embodiment of the inventive concept.

FIG. 9 is a diagram illustrating the configuration of a portable phone according to an exemplary embodiment of the inventive concept. The portable phone 900 includes an antenna 910, a wireless transceiver 920, a memory 930, a camera 940, a processor 950, an input unit 960, a display driver 970, a power supply 980, and a display panel 990. Herein, the input unit may be implemented with a keypad.

In FIG. 9, the processor 950 included in a portable phone 900 provides an image data signal DATA, a control signal CTRL, a voltage setting signal VSET and a boosting rate selection signal PBSEL to the display driver 970.

Figure 10:
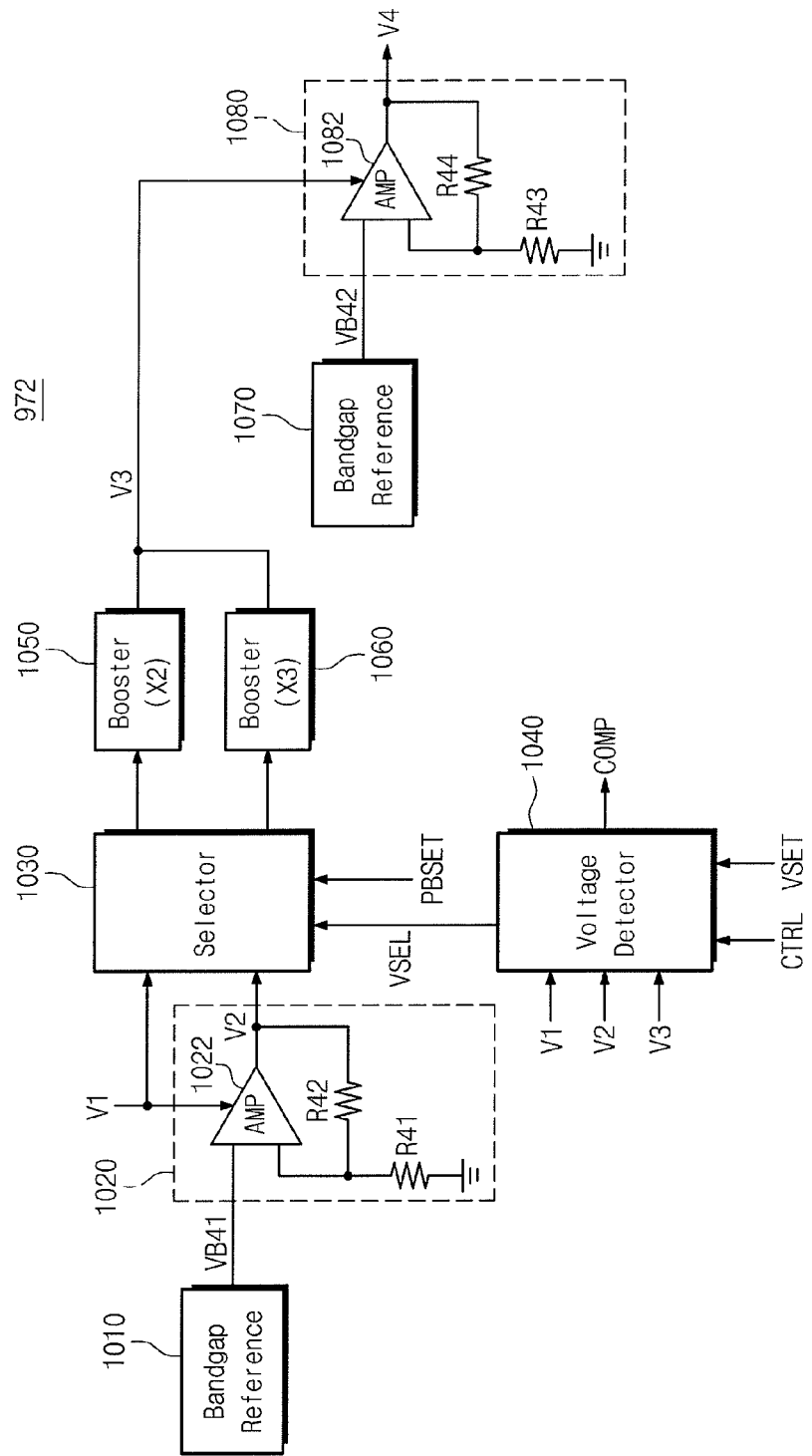
FIG. 10 is a diagram illustrating a boosting circuit included in the display driver of the portable phone in FIG. 9, according to an exemplary embodiment of the inventive concept.

FIG. 10 is a diagram illustrating a boosting circuit included in the display driver of the portable phone in FIG. 9, according to an exemplary embodiment of the inventive concept. The boosting circuit includes bandgap reference generators 1010 and 1070, amplifiers 1020 and 1080, a voltage selector 1030, a voltage detector 1040, and boosters 1050 and 1060. The amplifier 1020 may be configured with an operational amplifier 1022 and a non-inverting amplifier including resistors R41 and R42 and amplifier 1080 may be configured with an operational amplifier 1082 and a non-inverting amplifier including resistors R43 and R44.

Referring to FIG. 9 and FIG. 10, the voltage detector 1040 detects the levels of first to third voltages V1 to V3 in response to a control signal CTRL and a voltage setting signal VSET that are inputted from a processor, and thereby outputs a voltage selection signal VSEL and a comparison signal COMP. The voltage selection signal VSEL is inputted to the selector 1030, and the comparison signal COMP is inputted to the processor. The selector 1030 selects one of the first and second voltages V1 and V2 in response to the voltage selection signal VSEL from the voltage detector 1040. The selector 1030 transfers the selected voltage of the first and second voltages V1 and V2 to one of boosters 1050 and 1060, in response to the boosting rate selection signal PBSEL from the processor of the portable phone. The processor outputs the boosting rate selection signal PBSEL in response to the comparison signal COMP from the voltage detector 1040. Therefore, even when the level of a fourth voltage V4 is high and the level of the first voltage V1 is low, a desired level of the fourth voltage V4 can be stably generated.

Figure 11:
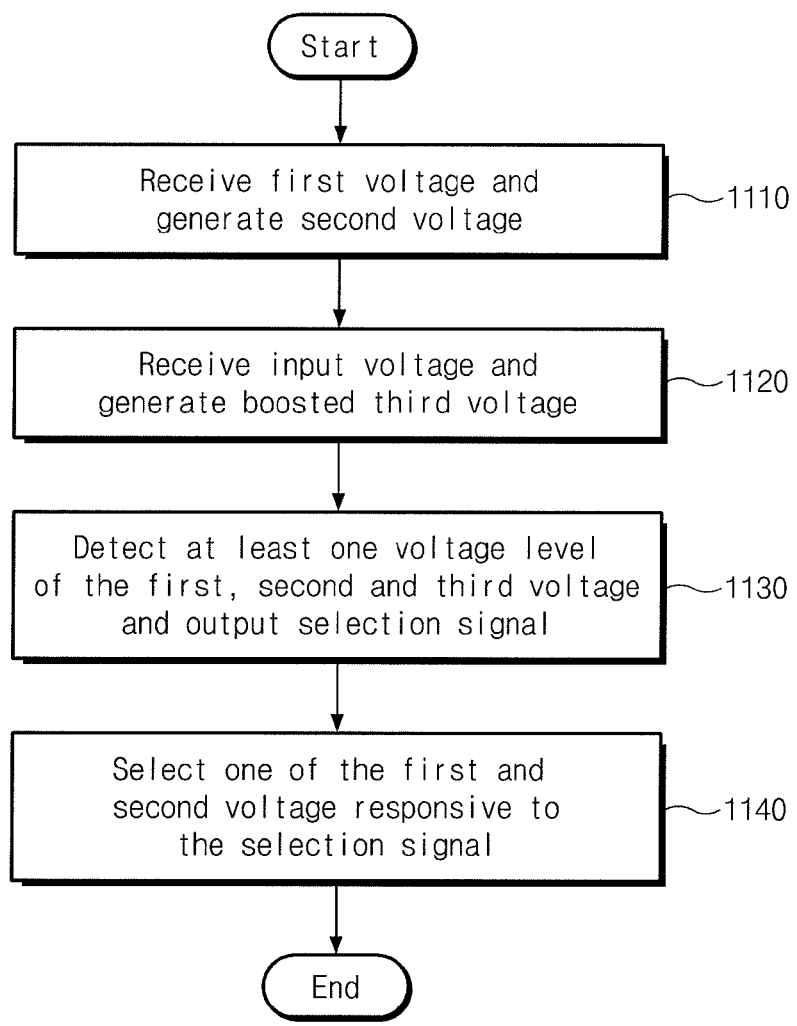
FIG. 11 is a flow chart illustrating a voltage boosting method according to an exemplary embodiment of the inventive concept.

FIG. 11 is a flow chart illustrating a voltage boosting method according to an exemplary embodiment of the inventive concept.

Referring to FIG. 11, a voltage generator receives a first voltage to generate a second voltage in operation 1110. A booster receives an input voltage to generate a third voltage in operation 1120. A voltage detector senses at least one voltage level of first to third voltages to output a selection signal in operation 1130. A selector selects one of the first and second voltages in response to the selection signal in operation 1140. The selected voltage of the first and second voltages is transferred as the input voltage of the booster.

The voltage detector generates first to third reference voltages that respectively correspond to the first to third voltages. The voltage detector compares the respective first to third voltages with the first to third reference voltages corresponding to them. The voltage detector outputs the selection signal according to the comparison result of the respective first to third voltages and the first to third reference voltages corresponding to them. For example, when the respective first to third voltages are lower than the first to third reference voltages corresponding to them, the voltage detector generates the selection signal for the first voltage to be selected.

The voltage detector may control the generation of the first to third reference voltages in response to a voltage sense signal that is inputted from the outside. Moreover, the voltage detector may control the comparison operation of the respective first to third voltages and the first to third reference voltages corresponding to them, in response to the voltage sense signal that is inputted from the outside. The voltage detector controls the generation of the first to third reference voltages and the comparison operation, thereby decreasing the power consumption of the voltage detector.

According to at least one of the above-described embodiments of the inventive concept, a boosting circuit can be implemented which stably generates a desired level of boosting voltage although the shift width of an input voltage is large.

The above-disclosed subject matter is to be considered illustrative and not restrictive, and is intended to cover all such modifications, enhancements, and other embodiments, which fall within the spirit and scope of the inventive concept.

What is claimed is:

1. A boosting circuit for a display panel, comprising:
a voltage generator receiving an external first voltage to output a second voltage;
a booster boosting an input voltage to output a third voltage;
a voltage detector detecting at least one voltage level of the first to third voltages to output a selection signal; and
a selector configured to receive the first and second voltages as inputs, select one voltage among the first and second voltages for output as the input voltage to the booster in response to the selection signal,
wherein the selector outputs the first voltage as the input voltage to the booster when the selection signal indicates the first voltage is to be boosted and outputs the second voltage as the input to the booster when the selection signal indicates the second voltage is to be boosted, and
wherein the voltage detector compares the first to third voltages with corresponding first to third reference voltages, respectively, and outputs the selection signal according to a result of the comparison.

2. The boosting circuit of claim 1, wherein the voltage detector comprises:
a reference voltage generator generating first to third reference voltages;
a first comparator comparing the first voltage with the first reference voltage;
a second comparator comparing the second voltage with the second reference voltage;
a third comparator comparing the third voltage with the third reference voltage; and
a logic circuit receiving outputs of the first to third comparators to output the selection signal.

3. The boosting circuit of claim 1, wherein the selector comprises:
a first switch connected between the first voltage and the booster, and controlled by an inverted signal of the selection signal; and
a second switch connected between the second voltage from the voltage generator and the booster, and controlled by the selection signal.

4. The boosting circuit of claim 1, wherein the voltage generator comprises:
a bandgap reference generator generating a bandgap reference voltage; and
an amplifier receiving the first voltage as a power source voltage, and amplifying the bandgap reference voltage to output the second voltage.

5. The boosting circuit of claim 1, further comprising:
a bandgap reference generator generating a bandgap reference voltage; and
an amplifier receiving the third voltage as a power source voltage, and amplifying the bandgap reference voltage to output a fourth voltage.

6. The boosting circuit of claim 1, wherein:
the booster comprises first and second boosting units having different boosting rates,
the voltage detector further outputs a boosting rate selection signal according to the respective detected levels of the first to third voltages, and
the selector inputs the selected voltage of the first and second voltages to one of the first and second boosting units according to the boosting rate selection signal.

7. The boosting circuit of claim 6, wherein
when the respective first to third voltages are lower than the corresponding first to third reference voltages, the voltage detector outputs the boosting rate selection signal for selecting a boosting unit having a high boosting rate from among the first and second boosting units.

8. The boosting circuit of claim 1, wherein the voltage generator comprises an amplifier receiving the external first voltage as a power source voltage and the amplifier outputs the second voltage.

9. An electronic device, comprising: a processor; a display panel; and
a display driver receiving an image signal from the processor, and driving the display panel for an image to be displayed on the display panel,
wherein the display driver comprises:
a voltage generator receiving an external first voltage to output a second voltage;
a booster boosting an input voltage to output a third voltage;
a voltage detector detecting at least one voltage level of the first to third voltages to output a selection signal;
a selector configured to receive the first and second voltages as inputs, and select one voltage among the first and second voltages for output as the input voltage to the booster in response to the selection signal;
a bandgap reference generator generating a bandgap reference voltage; and
an amplifier receiving the third voltage as a power source voltage, and amplifying the bandgap reference voltage to output a fourth voltage,
wherein the selector outputs the first voltage as the input voltage to the booster when the selection signal indicates the first voltage is to be boosted and outputs the second voltage as the input to the booster when the selection signal indicates the second voltage is to be boosted, and wherein the voltage detector compares the first to third voltages with corresponding first to third reference voltages, respectively, and outputs the selection signal according to a result of the comparison.

10. The electronic device of claim 9, wherein the voltage detector comprises:
a reference voltage generator generating first to third reference voltages;
a first comparator comparing the first voltage with the first reference voltage;
a second comparator comparing the second voltage with the second reference voltage;
a third comparator comparing the third voltage with the third reference voltage; and
a logic circuit receiving outputs of the first to third comparators to output the selection signal.

11. The electronic device of claim 10, wherein:
the booster comprises first and second boosting units having different boosting rates,
the voltage detector further outputs a boosting rate selection signal according to the respective detected levels of the first to third voltages, and
the selector inputs the selected voltage of the first and second voltages to one of the first and second boosting units according to the boosting rate selection signal.

12. The electronic device of claim 11, wherein the logic circuit of the voltage detector further outputs a boosting rate selection signal for selecting one of the first and second boosting units.

13. The electronic device of claim 11, wherein:
the processor outputs a boosting rate selection signal for selecting one of the first and second boosting units, and
the selector inputs a voltage, which is selected from among the first and second voltages, to one of the first and second boosting units according to the boosting rate selection signal.

14. The electronic device of claim 9, wherein the voltage generator comprises a second amplifier receiving the external first voltage as a power source voltage and the second amplifier outputs the second voltage.

15. A voltage boosting method for a display panel, comprising:
supplying an external first voltage to output a second voltage;
boosting an input voltage by a boosting circuit to output a third voltage;
detecting at least one voltage level of the first to third voltages to output a selection signal;
selecting, by a selector one voltage among the first and second voltages input to the selector in response to the selection signal; and
outputting, by the selector, the selected voltage to the boosting circuit as the input voltage,
wherein the selecting comprises the selector outputting the first voltage as the input voltage to the boosting circuit when the selection signal indicates the first voltage is to be boosted and outputting the second voltage as the input to the boosting circuit when the selection signal indicates the second voltage is to be boosted, and
wherein the detecting of at least one voltage level comprises:
generating first to third reference voltages which respectively corresponds to the first to third voltages; and
comparing the first to third voltages with the corresponding first to third reference voltages, respectively.

16. The voltage boosting method of claim 15, wherein the supplying supplies the first voltage as a power supply voltage to an amplifier of the voltage generator and the amplifier outputs the second voltage.

* * * * *